United States Patent [19]
Firstenberg

[11] 3,846,016
[45] Nov. 5, 1974

[54] PERIPHERAL REAR VIEW MIRRORS FOR AUTOMOBILES

[76] Inventor: Harold S. Firstenberg, P.O. Box 3132, Redwood City, Calif. 94119

[22] Filed: May 1, 1973

[21] Appl. No.: 356,156

[52] U.S. Cl.................. 350/302, 350/277, 350/307, 350/299
[51] Int. Cl. ............................................. G02b 5/08
[58] Field of Search .......... 350/302, 303, 277, 283, 350/286–288, 301, 307, 299

[56] References Cited
UNITED STATES PATENTS

| | | | |
|---|---|---|---|
| 1,668,160 | 5/1928 | Lingner............................... | 350/283 |
| 3,166,197 | 1/1965 | Caylor et al. ....................... | 350/307 |
| 3,337,285 | 8/1967 | Travis................................. | 350/303 |
| 3,353,893 | 11/1967 | Bamberger et al. ................ | 350/302 |
| 3,411,841 | 11/1968 | Loftin................................. | 350/277 |

FOREIGN PATENTS OR APPLICATIONS

| | | | |
|---|---|---|---|
| 884,750 | 7/1953 | Germany............................ | 350/277 |

Primary Examiner—John K. Corbin
Assistant Examiner—Michael J. Tokar
Attorney, Agent, or Firm—Julian Caplan

[57] ABSTRACT

A dashboard mirror is mounted extending substantially across the entire width of the deck above and forward of the automobile dashboard. A top mirror is mounted across the width of the roof of the car, being supported by the rain gutter or other means and overhanging the front. Both mirrors are pivotted to brackets so that they may be adjusted to fit the automobile and the height and seat position of the driver. The line of sight from the rear of the vehicle is forward to the top mirror, then downward and slightly forward through the sloping windshield commonly used in automobiles, then to the dashboard mirror and then to the eye of the driver. Convex portions on the outer edges of the top mirror provide a view of the sides. The dashboard mirror may be provided with a pivotted sheet of plastic glare-preventing material hinged thereto which, when pivotted forward, covers the mirror and during the daytime may be pivotted out of the way.

3 Claims, 4 Drawing Figures

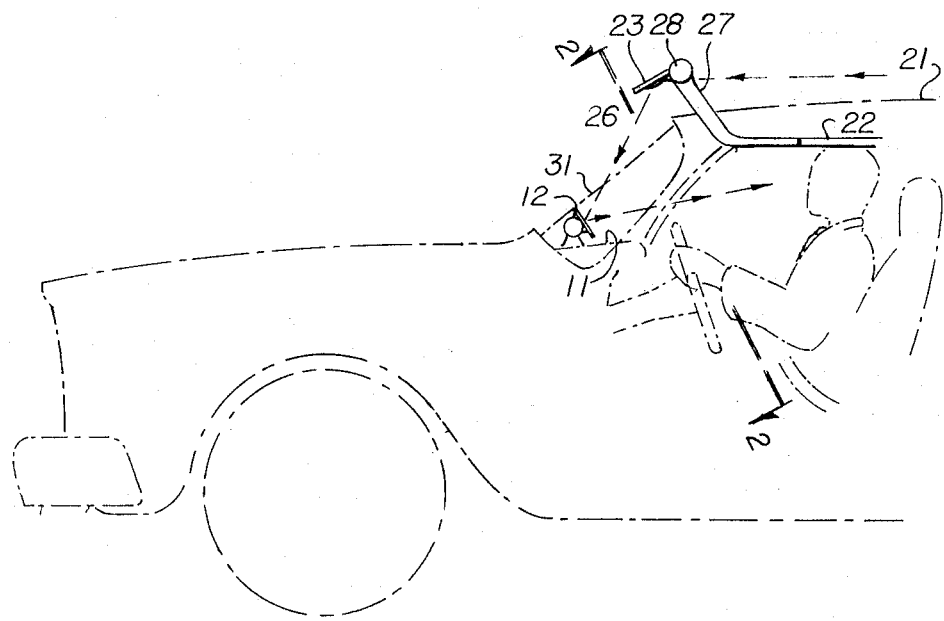
Fig. 1
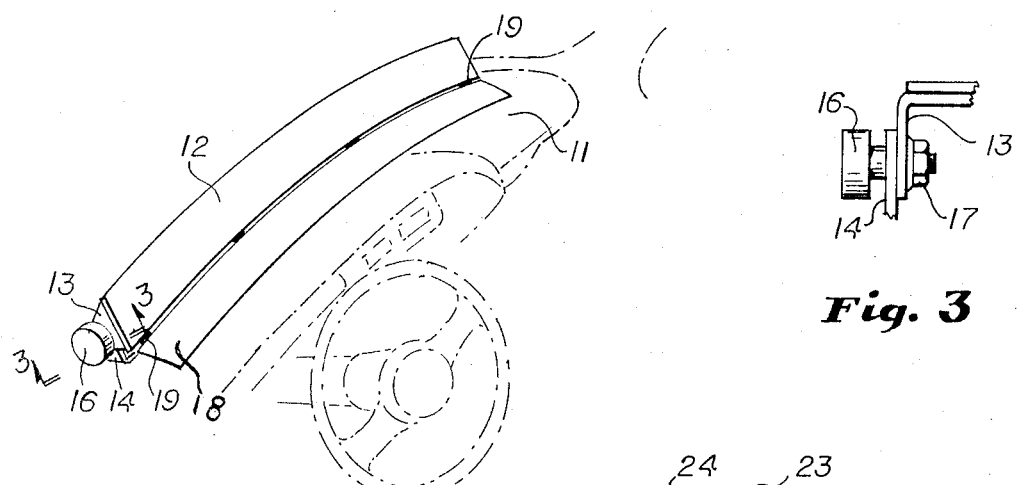
Fig. 2
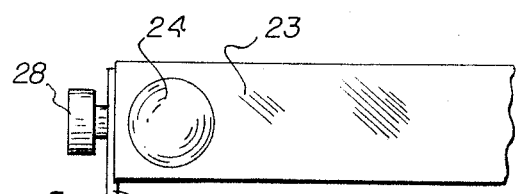
Fig. 3
Fig. 4

PERIPHERAL REAR VIEW MIRRORS FOR AUTOMOBILES

This invention relates to a new and improved peripheral rear view mirror. More specifically, the invention relates to a pair of mirrors, one located extending transversely across the deck or ledge immediately forward of the dashboard of a conventional modern automobile and the other located above the roof, the two mirrors being inter-related so that the line of sight from the rear and sides of the vehicle extends to the back of the top mirror, thence down through the windshield of the automobile to the bottom mirror and thence to the eyes of the driver.

The present invention eliminates many of the problems which presently exist with the two types of rear view mirrors commonly employed. Present-day rear view mirrors require that the driver take his eyes off the road to view the mirror. The present invention enables the driver to watch the rear and both sides without taking his eyes off the road. The conventional rear view mirror located inside the auto above and in front of the eyes of the driver has numerous disadvantages. A serious blind spot forward occurs because the mirror consumes approximately 25% of the front view area inasmuch as the driver's eyes are usually on the level with the mirror. Further, the view from the rear is restricted because of the angle of the mirror and the deep slope of the rear glass window. Finally, the rear view mirror of this type is blocked if there are three persons sitting in the front seat or even a tall person sitting in the middle of the rear seat of the vehicle. The person sitting in the middle of the front seat has his forward vision almost completely blocked by conventional mirrors, but not by the present invention. Because the proposed mirror is located inside the vehicle over the dashboard, it does not obscure any forward vision, since it lies in the line-of-sight of the forward hood of the vehicle.

As to side view mirrors, other problems exist. In the first place, it is difficult to adjust a side view mirror and keep it in adjustment. Further, the mirror has limited range and scope and has definite blind spots. Right hand side view mirrors are rare and have similar problems and also are difficult to adjust and to see. At night, side view mirrors reflect bright lights directly into the driver's eyes.

In addition to overcoming the disadvantages heretofore described in connection with conventional mirrors, the present invention has other advantages. For one instance, all persons seated in the front seat are able to use the mirror with equal ease and effect and the forward view is not obstructed. Further, a much wider field of view is achieved. A plastic glare shield may literally be attached to the lower mirror and hooked into position over the mirror to reduce glare at night. In addition, round convex mirrors may be positioned at either, or both, sides for viewing vehicles even directly alongside either side of the car. Accordingly, the device affords practically 180° vision, completely unobscured, eliminating all "blind" areas.

Mounting the top mirror on the roof of the car achieves additional function. The location of the mirror creates an updraft of air which keeps moisture, dirt and insects from being deposited on the front window. This also assists in keeping mist, ice and snow from forming on the windshield. Additionally, the device on the roof of the car exerts more gound pressure on the vehicle in direct proportion to the speed of the car similar to the action of the "wing" on modern racing cars.

Other objects of the present invention will become apparent upon reading the following specification and referring to the accompanying drawings in which similar characters of reference represent corresponding parts in each of the several views.

In the drawings:

FIG. 1 is a schematic view showing the invention installed on a conventional automobile.

FIG. 2 is a perspective view of the device.

FIG. 3 is an enlarged sectional view taken substantially along the line 3—3 of FIG. 2.

FIG. 4 is an enlarged fragmentary view of a portion of the top mirror and its attachment device.

FIG. 1 shows schematically the forward end of a conventional passenger vehicle. Extending forwardly of the dash is a horizontal deck 11 or a ledge. Bottom mirror 12 which extends transversely across the deck 11 is provided with brackets 13 secured to the back thereof which are in close proximity to bracket 14 which is attached to the deck 11. Knob 16 has a stem which extends through apertures in brackets 13 and 14 and is threaded into a nut 17 fixed to bracket 13. By tightening knob 16 the brackets 13 and 14 may be frictionally engaged to prevent pivotal movement of the mirror 12. However, by loosening knob 16 (which is preferably located only on the driver's side of the mirror 12) the mirror 12 may be adjusted in position to accommodate the height and seat position of the driver. To reduce the glare of lights of approaching vehicles during the nighttime period, a plastic shield 18 is fastened to the lower edge of mirror 12 by means of hinges 19. When not in use, the shield 18 lies on the ledge 11. When it is necessary to use the shield 18, it may be swung up to cover the surface of mirror 12. Mirror 12 may be straight or curved. If it is curved, the hinges 19 are located at either end and the plastic material of shield 18 is flexible enough so that it will curve to accommodate the shape of the lower mirror.

The roof 21 of a conventional automobile has a rain gutter 22 extending along the side edges. Various devices such as ski racks, luggage carriers, etc. may be attached to the roof 21 by means of clamps which engage the rain gutter 22, all as well understood in this art. A preferred means of mounting the top mirror 23 of the present invention is by means of the rain gutter 22. The mirror 23 is preferably provided at either end with a convex mirror 24 (only one of which is shown in FIG. 4) which affords a view of the side of the vehicle. Adjustment of mirror 23 is not as frequent as that of mirror 12. However, it is necessary to adjust it in its original installation and from time to time. The mirror 23 has a bracket 26 which is in proximity to bracket 27 attached to rain gutter 22. A knob 28 similar to knob 16 is used to frictionally engage the brackets 26, 27 after the adjustment is completed.

The line of sight from the rear is forwardly to the mirror 23 then down through the windshield 31 to the mirror 12 and back to the eyes of the driver. Access to the sides and, in fact, almost an entire 180° of vision is afforded. Further, the passenger, as well as the driver, can view objects in the mirror.

What is claimed is:

1. A rear-view mirror for vehicles having a ledge extending across the width of the windshield immediately behind the windshield comprising a dashboard mirror having a length approximately the width of said ledge and a relatively short height, mounting means fixed on each end of said dashboard mirror having attachment means for fastening said mounting means to said ledge, each said mounting means having a pivot to permit tilting of said dashboard mirror for adjustment of the line of sight of the driver of the vehicle, a top mirror on the exterior of the vehicle extending substantially across the width of the vehicle, second mounting means fixed to each end of said top mirror to position said mirror forward to the top of the windshield of the vehicle, said second mounting means including pivots to adjust the line of sight of the driver to the dashboard mirror, up through the windshield to the top mirror and thence to the rear and sides of the vehicle, said second mounting means including gripping means engageable with opposed rain gutters on the roof of the vehicle to secure said top mirror to the roof by means of the rain gutters.

2. A rear-view mirror according to claim 1 in which said dashboard mirror is curved to correspond to the curvature of the windshield and is upwardly-forwardly slanted and comprises a sheet of flexible glare-protecting plastic material and hinge means along the bottom edge of said mirror attaching the bottom edge of said sheet to said mirror whereby said sheet may lie flat on said ledge or be swung up against said dashboard mirror to protect the driver's eyes from the glare of headlights reflected in said mirror.

3. A rear-view mirror according to claim 1 which further comprises a convex mirror on at least one end of said top mirror to provide an enhanced angle of view to the side of said vehicle.

* * * * *